April 10, 1928.　　　　　　　　　　　1,665,513
E. E. THOMAS
VISOR ATTACHMENT FOR HATS AND CAPS
Filed April 28, 1926
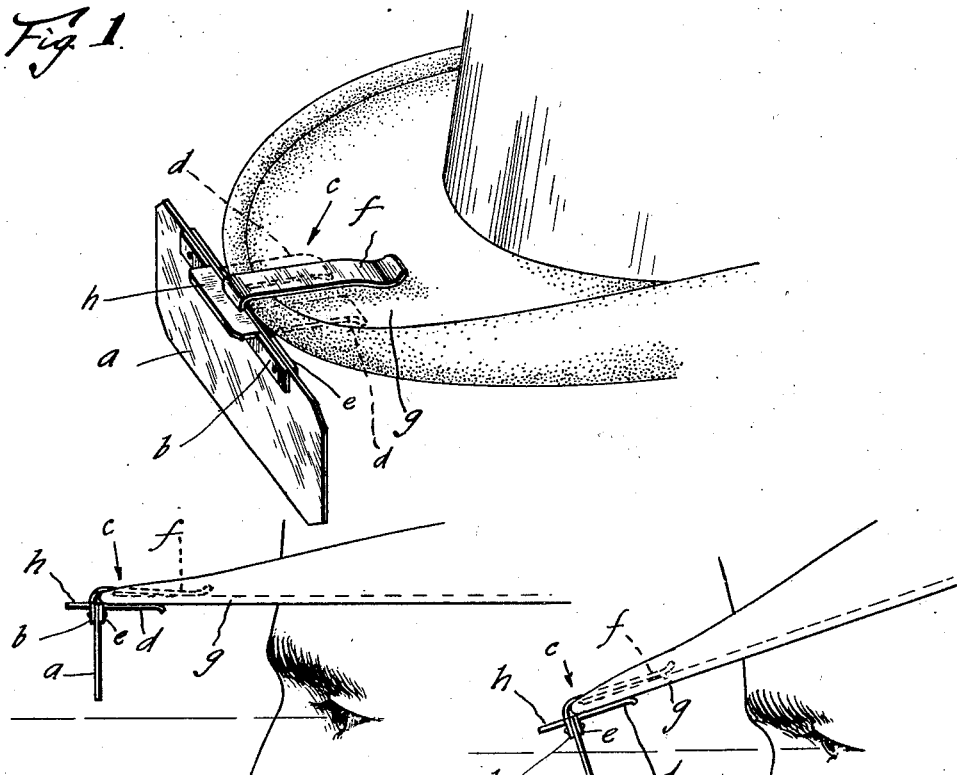
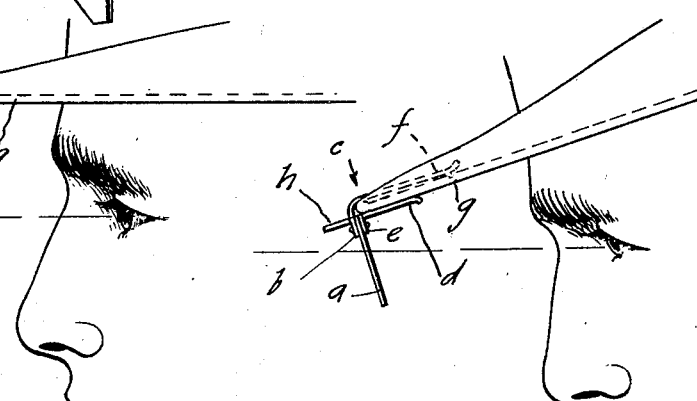
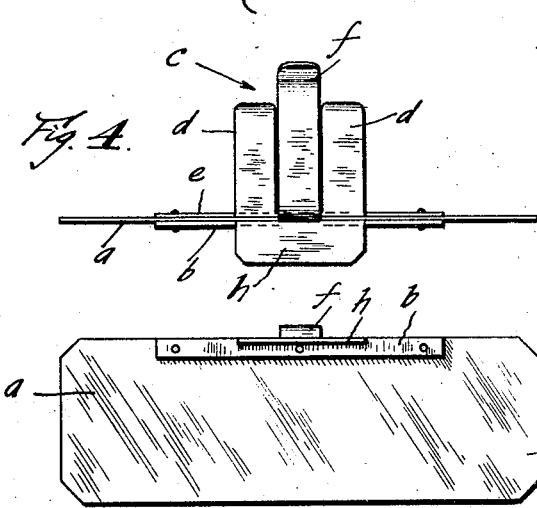
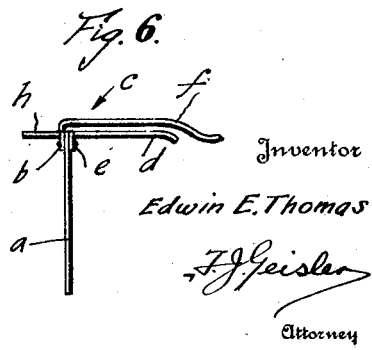
Inventor
Edwin E. Thomas
Attorney Patented Apr. 10, 1928.

1,665,513

UNITED STATES PATENT OFFICE.

EDWIN E. THOMAS, OF PORTLAND, OREGON, ASSIGNOR TO JOHN KIERNAN, OF PORTLAND, OREGON.

VISOR ATTACHMENT FOR HATS AND CAPS.

Application filed April 28, 1926. Serial No. 105,318.

My invention relates to an eye screen attachment for a hat or cap.

Motorists are often blinded by the bright lights of approaching cars and by the slanting rays of the sun reflected by the road surface, when driving towards it. To neutralize such blinding, motorists have to wear colored glasses. But these being in the form of spectacles tend to modify more or less the view the wearer obtains of the country or objects about him, but it is not practical to put the spectacles on and take them off again at frequent intervals.

The object of my invention is to provide a simple device which may be removable, affixed at the front of the brim of a hat or to the visor of a cap, and which the wearer may then place in front of or remove from his eyes by the mere inclination of his head. In that way being able to place an eye screen before his eyes when driving against strong rays of light and lifting the screen above the line of vision at all other times, thus facilitating a better and more convenient observation of the objects surrounding the wearer.

I attain my object by an eye screen attachment for head covers. The full details of my invention are hereinafter described in the accompanying drawings in which:

Fig. 1 is a perspective showing the front brim portion of a hat, and illustrating the construction and use of my invention as an attachment for the brim of the hat;

Fig. 2 is a diagrammatic side elevation illustrating how my eye screen is lifted out of the line of vision by merely holding the head up;

Fig. 3 is a similar view to Fig. 2 illustrating by merely tilting the head slightly downward that my eye screen may be thrown in the line of vision;

Figs. 4, 5, and 6 are details of construction of my invention hereinafter fully described.

My invention preferably consists of a piece of celluloid $a$ of any desirable color, which is mounted in a frame consisting of a bar $b$ and a bar $e$ and riveted in place. The pair of arms $d$, an integral part of the bar $b$ and an arm $f$, part of the bar $e$ form a spring clip $c$, the frame being made of resilient metal. The bar $b$ is provided with a flange $h$ as means for a finger hold.

In attaching my invention to a hat, the arms $d$ bear under and the arm $f$ bears on the brim, so providing an eye screen that may be moved into and out of the line of vision with only a very slight movement of the head.

The eye screen is of such light construction as to add no material weight to the hat and it may be easily and quickly removed as desired.

With my invention a motorist driving in the late afternoon, for instance in a westerly direction, is annoyed with the slanting rays of the sun. And as the road changes direction he merely needs to lift his head a trifle and the eye screen is out of his line of vision until he needs it again.

For night driving he is protected against the approaching car with undimmed lights, but may instantly raise his head and have an unobscured view of the road.

I claim:

A visor attachment for hats and caps, comprising a sheet of transparent material and a frame for removably connecting said sheet to the hat or cap, said frame comprising separate bars of less length and materially less width than that of the sheet, with means for securing the bars on opposite sides of and to the sheet in alignment with the upper edge thereof, the relatively inner bar having rearwardly extending spaced parallel spring arms and the relatively outer bar having a central spring arm extending vertically from the bar and then rearwardly into spaced parallel relation with the first mentioned arms, said relatively outer bar having a forwardly extending section to serve as a finger-hold in applying and removing the attachment, the spring bars cooperating to engage the visor of a hat or cap and the connection between the relatively outer bar and its spring arm providing a space to receive the forward edge of the visor to arrange the same in more or less vertical alignment with the sheet of transparent material.

EDWIN E. THOMAS.